May 31, 1949. E. DION 2,471,940
ALL PURPOSE WORK HOLDER FOR DRILLS AND THE LIKE
Filed July 8, 1946
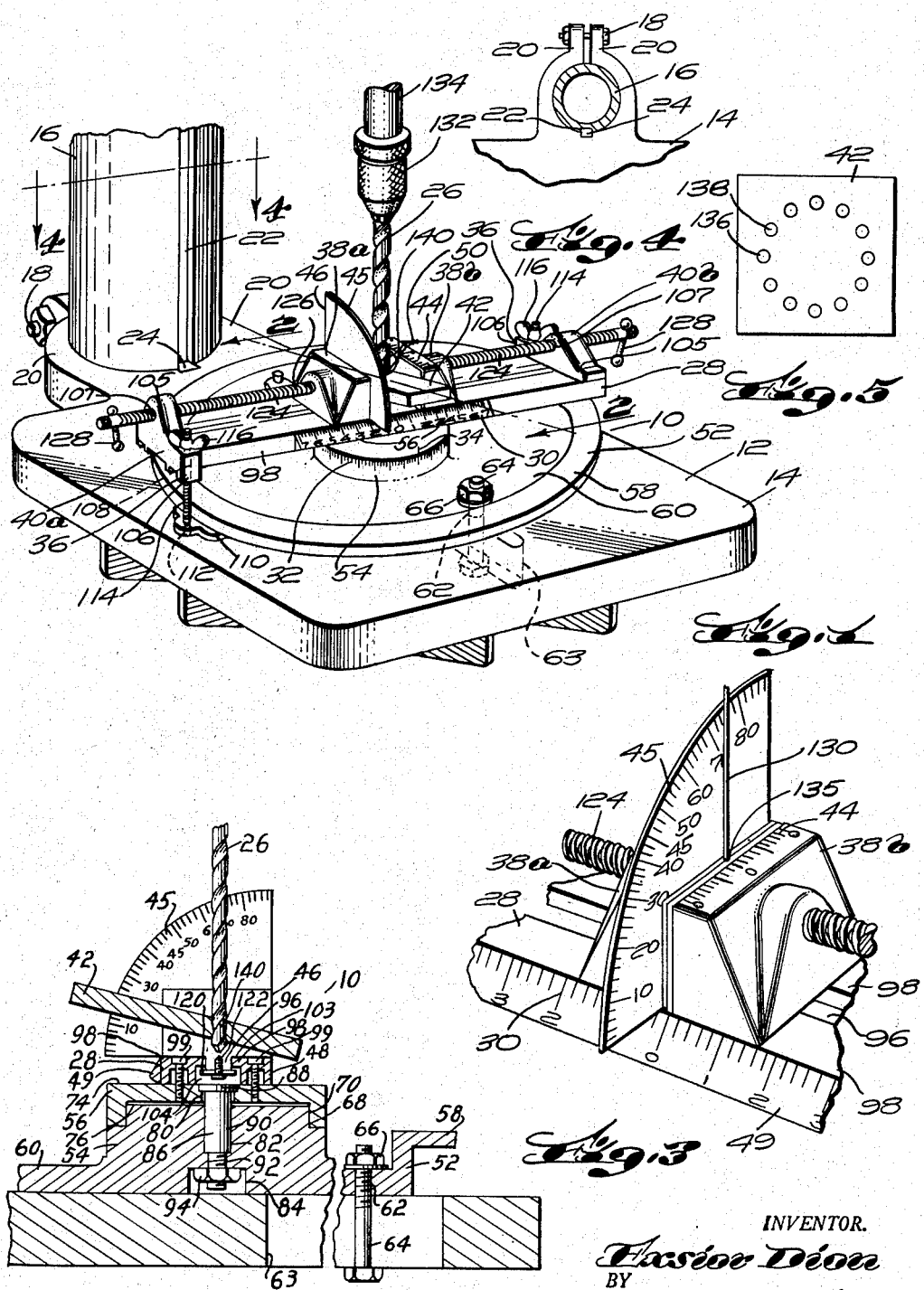
INVENTOR.
Euséve Dion
BY
Thomas A. Jenckes
Attorney Patented May 31, 1949

2,471,940

UNITED STATES PATENT OFFICE 2,471,940

ALL-PURPOSE WORK HOLDER FOR DRILLS AND THE LIKE

Exsior Dion, Lincoln, R. I.

Application July 8, 1946, Serial No. 681,994

4 Claims. (Cl. 77—63)

My invention relates to all purpose work holders for drills, milling machines and the like. I am aware that others have provided cumbrous work holders for drills, milling machines and the like, containing a large number of parts and which when it was desired to adjust them to move the work relative to the tool, it was necessary to move the entire work holder in the desired direction relative to the table. I am also aware that it is standard practice when it is desired to perform the same work on a multiplicity of pieces to provide special jigs for this purpose. My invention relates, however, to an all purpose work holder for drills, milling machines and the like, which may be used with the multiplicity of different small jobs, each job often involving only a single piece of work, which come up in the usual machine shop, and an object of my invention, therefore, is to provide a suitable, simple work holder particularly designed for this purpose.

As stated, the prior art adjusted the work relative to the tool by moving the work holder. I believe, therefore, that I have provided a new principle in work holders of this type, namely the provision of a simple work holder which will permit the movement of the work itself to the different desired positions quickly for different work on different pieces, or for different work on the same piece.

For this purpose, I provide means to non-rotatably mount the work holder on the drill press table such means being not necessary in a milling machine as it is normally provided by the structure of the milling machine itself, and vise jaws for holding the work, each of which is independently radially adjustable relative to the center of the work holder, so that the work may be moved laterally of the center by moving both vise jaws the desired amounts and the work may be adjusted transversely of the center and to the desired position on freeing the vise jaws, and then clamped by the vise jaws in the desired position.

A further object of my invention is to provide a work holder which may be rotatably mounted relative to a center, so as to permit, if desired, long pieces of work to be drilled thereon without coming into contact with the usual drilling machine column or post.

A further object of my invention is to provide scale means, so that the relative positions of the work and tool may be accurately varied transversely of the center, laterally of the center and, if desired, rotatably on the center.

I thus provide means to mount the work holder on the table, so that it may be rotated adjustable amounts thereon, so as to get different angular positions of the work relative to a milling cutter, if desired.

It is also apparent that the three scales permit the relative movements of the work, if desired, for different types of work thereon, such as drilling a plurality of holes in geometric relation to each other, such as a circle, the amounts that the work should be moved for this purpose being readily calculable from the particular scales, so that the next desired setting of a drill hole to complete a geometric figure may be quickly figured by triangulation, if desired.

A further object of my invention is to provide a device in which the work may be tilted at any desired angle relative to the tool to cut any desired angular edge thereon in a milling machine or to drill any desired angular hole in a drill, and for this purpose I provide a vertical 90 degree quadrant scale, measuring the amount of tilt of the work relative to the rear edge of the vise run-way bar. Thus, with my improved attachment, it is possible to mill any desired surface on the work or to drill any desired angle through the work and to drill any desired multiplicity of holes in the desired predetermined relationship to each other.

A further object of the specific embodiment of my invention shown is to provide as a portion of the means for mounting my improved work holder on the work table, of a hollow plate for catching the work detritus or shavings as the work is being machined and preventing them from scattering on the floor or over the machine.

A further object of my invention is to provide a novel type of work holder which is readily removable and detachable for use on different machines, constructed of a minimum number of strong, simple parts.

These and such other objects of my invention as may hereinafter appear will be best understood from a description of the accompanying drawings which illustrate an embodiment thereof.

In the drawings,

Fig. 1 is a perspective view of my improved work holder mounted on a standard type of drill press table.

Fig. 2 is a broken, transverse sectional view taken along the line 2—2 of Fig. 1.

Fig. 3 is an enlarged perspective view of the vise and adjacent scales.

Fig. 4 is a horizontal sectional view taken through the column and the adjacent portion of the table along the line 4—4 of the drill shown in Fig. 1.

Fig. 5 is a plan view of a piece drilled on my work holder, having a plurality of holes therein arranged in circular formation.

In the drawings, wherein like characters of reference generally indicate like parts throughout, 10 generally indicates a work holder constructed in accordance with my invention.

As stated hitherto, my invention comprises an all purpose work holder for drills, milling machines and the like, capable of being mounted on a drill press table, so that a hole may be drilled in any desired relative position of the work and at any desired angle through the work as shown in Fig. 1, or which may be alternatively, if desired, mounted on a milling machine to cut a surface on any desired angular position on the work.

In accordance with my invention, it is essential, particularly in a drill, that the drill itself be centered relative to the work and work holder and always remain in the same non-rotatable position.

I have shown in the drawings, a drill press 12, having a standard type of table 14 for holding the work and the usual column or post 16, with the table 14 being vertically adjustable relative to said post, in the embodiment shown, by loosening the bolt 18 joining the rear ends of the split bearing arms 20 together and moving the table 14 relative to the column 16. In order that the table may be non-rotatably mounted relative to the column 16, I form the groove 22 in the column and mount the spline 24 on the table to fit in said groove 22 to positively prevent the table from being rotated relative to the column, so that the drilling tool 26 will always be centered relative to the table and my improved tool holder 10. Thus said machine has the tool 26 which in the drill vertically reciprocates to drill the holes and the work holding table means 14 non-rotatably vertically adjustably mounted relative to said tool.

I provide vise jaw run-way means 28 rotatably mountable on said table means 14. I preferably provide the scale 30 reading in both directions from "0" at the center thereof on the front of said runway means. For purposes which will be apparent, I provide either the table means 14 or run-way means 28 with a circumferential scale 32 on one of said means and a pointer 34 on the other of said means, movable relative to said scale on relative movements of said runway means 28 relative to said table means 14. I also provide means 36 to adjustably clamp the runway means 28 to said table means at different angular positions thereof to hold the runway means 28 in the desired angular position on said table means. I provide two movable vise jaws 38ᵃ and 38ᵇ radially adjustable on said runway means 28, and means 40ᵃ and 40ᵇ to independently radially adjust the position of its respective vise jaw 38ᵃ or 38ᵇ from the center of said runway means and retain it in adjusted position abutting the work 42. I also provide the scale 44 reading in both directions from the center thereof mounted transversely on one of said vise jaws, in the embodiment shown on the vise jaw 38ᵇ, whereby the work 42 may be adjusted transversely and longitudinally relative to the center of said runway means and clamped in adjusted position by clamping the vise jaws together.

I also provide a quadrant scale 45 extending transversely, vertically adjacent a vise jaw with the vertical edge 46 thereof aligned with the rear edge 48 of the runway means 28 to mount the work at any desired tilted angle relative to said rear edge 48 of said runway means, said quadrant having a scale reading upwardly from horizontal to vertical.

In the preferred embodiment shown, to catch the shavings or detritus 50 from the work being machined, as part of the means to mount the runway means 28 on the table, I provide a disc shaped plate 52 rigidly mountable on said table 14, having a base 54 projecting upwardly from said plate on which the scale 32 may be mounted and a vise runway base 56 rigidly projecting downwardly from the center of said runway means 28 and secured to said plate base 54 to be rotatable thereon, and having a pointer 34 thereon movable relative to the scale 32 on said plate base.

In the specific embodiment shown, my improved parts may be constructed as follows: The disc shaped plate 52 is provided with the upstanding peripheral rim 58 and the body 60 of the plate is provided with the bolt holes 62, so that the plate 52 may be rigidly mounted on said table 14 by the bolts 64 projecting through the holes 62 and suitable slots 63 in said table and having the nuts 66 threaded on the upper ends thereof to firmly clamp the base of said plate 52 to said table means. I provide the cylindrical base 54 projecting upwardly from the plate body 60, having the circumferential scale 32 on the upper portion of the outer periphery thereof and having above it an inset peripheral shoulder 68, forming a trunnion 70 internally thereof. I provide a cylindrical vise base 56 having a flat upper wall 74 and a down turned peripheral lip 76, having the vertical pointer mark 34 thereon, rotatably mounted on the trunnion 70 of said plate base 54. In order that said vise runway base 56 may be firmly mounted on said plate base 54, I provide a center hole 80 in the upper wall 74 of said runway base and a cooperating hole 82 running to an enlarged bore 84 in the bottom of said plate body 60 and I provide the bolt 86 having the head 88 fitting into a countersink in said top wall 74, the smooth stem 90 projecting downwardly through said hole 82, terminating in a threaded lower end 92, adapted to have the nut 94 thereon within said enlarged bore 84 to provide an axial shaft for rotatably mounting the runway base 56 on the plate base 54. The vise runway bar 28 is centrally slotted as at 96, providing the spaced bars 98 on each side thereof, which may be secured to the vise runway base 56 in any suitable manner, such as by the screws 99 projecting downwardly through suitable cooperating holes therein and in said vise runway base 56, with the heads thereof suitably countersunk in the upper surfaces of said bars 98. The inner walls of each bar have their lower ends cut away to provide the space 104 underneath them, extending from the lower end of the slot 96 for a purpose to be described to provide the inwardly projecting upper ends 103 above them. The runway means or bar 28 has a bracket 105 projecting upwardly from each end thereof exterior of said plate rim 58, having a threaded radial hole 107 therein.

The front edge 49 of said runway is preferably provided with the scale 30 reading in both directions from the center thereof, preferably tilted at an angle inwardly, as shown, to be more readily readable.

To provide the clamping means 36, each vise bracket 105 may be provided with the lug 106 projecting laterally therefrom, having a vertical bolt hole 108 therein. I also provide a clamping plate 110 adapted to underlie the rim 58 underneath each bolt hole 108, having a bolt hole 112 therein and a bolt 114 projecting upwardly through the aligned bolt holes 112 and 108 and a wing nut 116 rotatable on the end of said bolt to raise said bolt 114 and plate 110 and clamp it against the under surface of said rim 58 to hold the runway bar 28 in the desired angular position on said plate 52.

I provide the movable vise jaws 38ª and 38ᵇ on each side of the center of said runway bar 28, each having a stem 118 projecting downwardly therefrom through the slot 96 in said runway bar 28 and means flaring laterally therefrom to underlie said runway bar in the embodiment shown, comprising a washer 120 adapted to underlie the inwardly projecting upper ends 103 of the side bars 98 adjacent the slot 96 and secured to said stem 118 by a small screw 122 projecting upwardly within a suitable hole in said stem 118.

I also provide a threaded vise shaft 124 for each jaw, having its inner end 126 rotatably mounted in a suitable socket in each respective vise jaw 38ª and 38ᵇ extending outwardly through the respective threaded hole 107 in each respective vise bracket 105 and having the respective handle 128 on the outer end thereof.

As stated, I provide the scale 44 reading in both directions from the center thereof mounted transversely on top of one of said vise jaws, in the embodiment shown the vise jaw 38ᵇ and the vertical quadrant scale 45 extending transversely across a vise jaw from the rear edge 48 of said runway bar 28.

Thus, it is obvious that on release of the clamping means 36, on releasing the wing nuts 116 that the runway bar 28 may be adjusted to any desired position on the plate 52 and again clamped in position on tightening the wing nuts 116. The respective vise jaws 38ª and 38ᵇ may be adjusted relative to the center of the plate 52 by suitable turning of the handles 128. It is thus obvious that with my improved construction, the work holder may be rotated on a vertical axis to any desired position relative to the column 16 and locked in said position, the work may be moved laterally by radial manipulation of the respective vise jaws 38ª and 38ᵇ and clamped in a desired position by them and the work may be correspondingly moved transversely on loosening of said vise jaws. It is also apparent that the work may be tilted relative to the rear edge 48 of the runway bar, the amount of tilt being measured by the quadrant scale 45.

In use, it is desirable on a drill to be sure that the work holder is centered relative to the tool 26 and for this purpose a pin 130 may be mounted in the chuck 132 on the vertically reciprocating drill spindle 134 and depressed until it fits into a predetermined hole 135 half formed in each respective vise jaw to be thus centrally of the transverse scale 44 and centrally of the lateral scale 30 to make sure that the work holder 10 is adjusted accurately relative to the tool 26.

Fig. 5 illustrates a specimen of work which may be drilled with my attachment. The work 42 for this purpose may be mounted in a flat position by the vise in a position to drill the hole 136 therein, by visual triangulation on the horizontal circumferential scale 32, the position of the next respective hole may be predetermined and the amounts visually measured off on the scales 30 and 44 necessary to move the work laterally and transversely the desired amount to drill said next respective hole 138. It is apparent that my improved work holder is readily adaptable for most not too precise work in the shop.

In addition, if it be desired to drill angular holes in the work 42, the work 42 may be tilted on the rear edge 48 to the desired angle on the scale 45 which reads from "0" upwards, the vise jaws 38ª and 38ᵇ firmly clamped together and the drill 26 depressed to drill the desired angular hole 140 shown in Figs. 1 and 2.

As explained, my improved work holder 10 is also rotatably mounted on the table so that extremely long lengths may be drilled without having their inner ends strike the column 16.

In similar manner, the various scales, including the circumferential horizontal scale 32, the lateral scale 30, the transverse scale 44 and the quadrant scale 45 may be employed to cut any desired surface with a milling cutter at any desired angle, if the work be tilted relative to said rear edge 48 and clamped in the desired position by the vise jaws 38ª and 38ᵇ.

It is understood that my invention is not limited to the specific embodiment shown and that various deviations may be made therefrom without departing from the spirit and scope of the appended claims.

What I claim is:

1. A work holder for drills, milling machines and the like having a tool and work holding table means non-rotatably vertically adjustably mounted relative to said tool comprising vise jaw run-way means rotatably mountable on said table means having a scale reading in both directions from the center thereof, one of said means having a circumferential scale thereon and the other of said means having a pointer mark movable relative to the circumferential scale, means to adjustably clamp said run-way means to said table means at different angular positions thereof to hold the run-way means in the desired angular position on said table means, vise jaws radially adjustable on said run-way means, means to independently radially adjust the position of each vise jaw from the center of said run-way means and retain it in adjusted position abutting the work, a scale reading in both directions from the center thereof mounted transversely on one of said vise jaws, whereby the work may be adjusted transversely and longitudinally relative to the center of said run-way means and clamped in adjusted position and a quadrant scale extending transversely vertically adjacent a vise jaw from the rear edge of said run-way means with the vertical edge thereof aligned with the rear edge of said run-way means to mount the work at any desired tilted angle relative to said rear edge of said run-way means.

2. A work holder for drills, milling machines and the like having a tool and work holding table means non-rotatably vertically adjustably mounted relative to said tool, comprising vise jaw run-way means rotatably mountable on said table means, having a scale reading in both directions from the center thereof, means to adjustably clamp said run-way means to said table means at different angular positions thereof to hold the run-way means in the desired angular position on said table means, vise jaws radially adjustable on said run-way means, means to independently radially adjust the position of each vise jaw from the center of said run-way means and retain it in adjusted position abutting the work, a scale reading in both directions from the center thereof mounted transversely on one of said vise jaws, whereby the work may be adjusted transversely and longitudinally relative to the center of said run-way means and clamped in adjusted position and a quadrant scale extending transversely adjacent a vise jaw from the rear edge of said run-way means with the vertical edge thereof aligned with the rear edge of said run-way means to mount the work at any desired tilted angle relative to said rear edge of said run-way means.

3. A work holder for drills having a column and a table non-rotatably vertically adjustably mounted on said column, comprising a disc shaped plate, having an upstanding rim adapted to be rigidly mounted on the table, a cylindrical base projecting upwardly from the plate having a circumferential scale thereon, having an inset peripheral shoulder forming a trunnion, a cylindrical vise base freely rotatable on said trunnion, having a downturned peripheral lip having a vertical pointer mark thereon, a centrally slotted vise run-way bar extending diametrically across said disc mounted on top of said base, having a scale reading in both directions from the center thereof, and a bracket having a threaded radial hole therein projecting upwardly at each end thereof, having a lug projecting laterally therefrom, having a vertical bolt hole therein, a clamping plate adapted to underlie said rim underneath each bolt hole, having a bolt hole therein, a bolt projecting upwardly through both holes and a nut rotatable on the end of said bolt to raise said bolt and plate and clamp it against said rim to hold the runway bar in said desired angular position on said plate, a vise jaw on each side of the center thereof, having a stem projecting downwardly therefrom through the slot in said run-way bar and means flaring laterally therefrom to underlie said runway bar, a threaded vise shaft having its inner end rotatably mounted in each vise jaw, extending outwardly through the threaded hole in each vise bracket and having a handle on the outer end thereof, a scale reading in both directions from the center thereof mounted transversely on top of one of said vise jaws and a vertical quadrant scale extending transversely across a vise jaw from the rear edge of the run-way bar.

4. A work holder for drills having a column and a table non-rotatably vertically adjustably mounted on said column, comprising a disc shaped plate, having an upstanding rim adapted to be rigidly mounted on the table, a cylindrical base projecting upwardly from the plate, having an inset peripheral shoulder forming a trunnion, a cylindrical vise base freely rotatable on said trunnion, having a downturned peripheral lip, a centrally slotted vise run-way bar extending diametrically across said disc mounted on top of said base, and a bracket having a threaded radial hole therein projecting upwardly at each end thereof, having a lug projecting laterally therefrom, having a vertical bolt hole therein, a clamping plate adapted to underlie said rim underneath each bolt hole, having a bolt hole therein, a bolt projecting upwardly through both holes and a nut rotatable on the end of said bolt to raise said bolt and plate and clamp it against said rim to hold the run-way bar in said desired angular position on said plate, a vise jaw on each side of the center thereof, having a stem projecting downwardly therefrom through the slot in said run-way bar and means flaring laterally therefrom to underlie said run-way bar, and a threaded vise shaft having its inner end rotatably mounted in each vise jaw extending outwardly through the threaded hole in each vise bracket and having a handle on the outer end thereof.

EXSIOR DION.

REFERENCES CITED

The following references are of record in the file of this patent:

UNITED STATES PATENTS

| Number | Name | Date |
| --- | --- | --- |
| 481,737 | Scheidt | Aug. 30, 1892 |
| 1,396,302 | Wagner | Nov. 8, 1921 |
| 2,214,663 | Dewey | Sept. 10, 1940 |
| 2,369,901 | Kozaroczy | Feb. 20, 1945 |
| 2,407,769 | Anderson | Sept. 17, 1946 |